United States Patent
Garcia et al.

(10) Patent No.: US 12,425,461 B2
(45) Date of Patent: Sep. 23, 2025

(54) ENABLING A FIRST MOBILE DEVICE ASSOCIATED WITH A WIRELESS TELECOMMUNICATION NETWORK TO RECEIVE ASSISTANCE FROM A SECOND MOBILE DEVICE IN A SHARED WEB PAGE

(71) Applicant: T-Mobile USA, Inc., Bellevue, WA (US)

(72) Inventors: Nestor Garcia, Atlanta, GA (US); Kristian D. Taylor, Chester, VA (US); Beth Ann Tong, McKinney, TX (US); Ramesh Vemula, Olathe, KS (US); Qianwen Wen, Herndon, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 396 days.

(21) Appl. No.: 18/178,408

(22) Filed: Mar. 3, 2023

(65) Prior Publication Data
US 2024/0297906 A1 Sep. 5, 2024

(51) Int. Cl.
*H04L 65/401* (2022.01)
*H04W 4/30* (2018.01)
*H04W 8/00* (2009.01)

(52) U.S. Cl.
CPC .......... *H04L 65/4015* (2013.01); *H04W 4/30* (2018.02); *H04W 8/005* (2013.01)

(58) Field of Classification Search
None
See application file for complete search history.

(56) References Cited

U.S. PATENT DOCUMENTS

| | | |
|---|---|---|
| 7,010,317 B2 | 3/2006 | Hwang et al. |
| 7,630,725 B2 | 12/2009 | Kwak et al. |
| 7,653,001 B2 | 1/2010 | Agrawal et al. |
| 7,849,135 B2 | 12/2010 | Agrawal et al. |
| 8,099,106 B2 | 1/2012 | Soliman et al. |
| 8,208,910 B2 | 6/2012 | Agrawal et al. |
| 8,250,168 B2 | 8/2012 | Robison et al. |

(Continued)

FOREIGN PATENT DOCUMENTS

| | | |
|---|---|---|
| CN | 101400026 B | 4/2011 |
| CN | 101312585 B | 12/2011 |

(Continued)

*Primary Examiner* — Frantz Bataille
(74) *Attorney, Agent, or Firm* — Perkins Coie LLP

(57) ABSTRACT

The disclosed system receives an indication to seek assistance from a second UE, including a unique identifier of the second UE. The system generates a shared digital location configured to present an output of the computer program and a first avatar indicating a cursor location and an input provided by the first UE. The system generates a unique identifier of the shared digital location. The system generates a message including the unique identifier associated with shared digital location and sends the message to the second UE. The system receives a selection of the unique identifier of shared digital location included in the message from the second UE. Upon receiving the selection, the system generates a second avatar representing indicating a cursor location associated with the second UE. The system provides the shared digital location, the first avatar, and the second avatar to the first and second UE.

20 Claims, 7 Drawing Sheets

(56) References Cited

U.S. PATENT DOCUMENTS

| | | |
|---|---|---|
| 9,119,062 B2 | 8/2015 | Escott et al. |
| 9,208,242 B2 | 12/2015 | Kindberg |
| 9,591,677 B2 | 3/2017 | Zhang |
| 9,596,698 B2 | 3/2017 | Timus et al. |
| 9,615,194 B2 | 4/2017 | Zhang et al. |
| 9,635,652 B2 | 4/2017 | Wu |
| 9,654,914 B2 | 5/2017 | Zhang et al. |
| 9,659,312 B1 | 5/2017 | Ellis et al. |
| 9,710,821 B2 | 7/2017 | Heath |
| 9,763,128 B2 | 9/2017 | Huang et al. |
| 9,769,610 B1 | 9/2017 | Gordon et al. |
| 9,838,958 B2 | 12/2017 | Shu et al. |
| 9,844,078 B2 | 12/2017 | Park et al. |
| 9,923,622 B2 | 3/2018 | Jactat et al. |
| 9,942,875 B2 | 4/2018 | Worrall |
| 10,085,212 B2 | 9/2018 | Ma et al. |
| 10,306,488 B2 | 5/2019 | Lindoff et al. |
| 10,541,926 B2 | 1/2020 | Singh et al. |
| 10,609,561 B2 | 3/2020 | Nakarmi et al. |
| 10,788,879 B2 | 9/2020 | Link |
| 10,805,768 B2 | 10/2020 | Lee et al. |
| 10,869,160 B1 | 12/2020 | Mitra et al. |
| 11,057,865 B1 | 7/2021 | Wong et al. |
| 11,159,936 B2 | 10/2021 | Wang et al. |
| 11,196,803 B2 | 12/2021 | Puente Pestaña et al. |
| 11,212,670 B2 | 12/2021 | Wang et al. |
| 11,212,864 B2 | 12/2021 | Wang |
| 11,263,894 B1 | 3/2022 | Sivakumar et al. |
| 11,405,834 B2 | 8/2022 | Deng |
| 11,409,584 B2 | 8/2022 | Wu |
| 11,412,556 B2 | 8/2022 | Dao et al. |
| 11,490,329 B1 | 11/2022 | Artuso |
| 11,496,886 B2 | 11/2022 | Guo et al. |
| 2005/0107037 A1 | 5/2005 | Delmulle et al. |
| 2006/0218291 A1 | 9/2006 | Zhu et al. |
| 2013/0163533 A1 | 6/2013 | Anderson et al. |
| 2014/0073317 A1 | 3/2014 | Zhou et al. |
| 2015/0195760 A1 | 7/2015 | Sanz et al. |
| 2015/0304821 A1 | 10/2015 | Liu et al. |
| 2016/0249248 A1 | 8/2016 | Rönneke et al. |
| 2016/0249278 A1 | 8/2016 | Qi et al. |
| 2017/0238177 A1 | 8/2017 | Lee |
| 2017/0325057 A1 | 11/2017 | Zhang et al. |
| 2017/0347257 A1 | 11/2017 | Xu et al. |
| 2018/0115905 A1 | 4/2018 | Sirotkin |
| 2020/0022104 A1 | 1/2020 | Geng et al. |
| 2020/0236534 A1 | 7/2020 | Wang |
| 2020/0245143 A1 | 7/2020 | Luft et al. |
| 2021/0039497 A1 | 2/2021 | Zhang et al. |
| 2021/0306806 A1 | 9/2021 | Dang et al. |
| 2021/0368547 A1 | 11/2021 | Kadiri et al. |
| 2022/0030513 A1 | 1/2022 | Velev et al. |
| 2022/0086713 A1 | 3/2022 | Määttänen et al. |
| 2022/0246013 A1 | 8/2022 | Worecki |
| 2022/0256407 A1 | 8/2022 | Chen et al. |
| 2022/0261498 A1 | 8/2022 | Ricchuiti et al. |
| 2022/0272486 A1* | 8/2022 | Woo ............... H04W 4/029 |
| 2022/0295445 A1 | 9/2022 | Göktepe et al. |
| 2022/0385700 A1* | 12/2022 | Kasaba ............ H04L 51/02 |
| 2022/0394088 A1 | 12/2022 | Salkintzis et al. |
| 2022/0394576 A1 | 12/2022 | Niu et al. |

FOREIGN PATENT DOCUMENTS

| | | |
|---|---|---|
| CN | 104604298 A | 5/2015 |
| CN | 104813630 A | 7/2015 |
| CN | 105247922 A | 1/2016 |
| CN | 105432045 A | 3/2016 |
| CN | 103384993 B | 10/2016 |
| CN | 106576125 A | 4/2017 |
| CN | 107005540 A | 8/2017 |
| CN | 107079517 A | 8/2017 |
| CN | 103974229 B | 2/2018 |
| CN | 104580272 B | 5/2018 |
| CN | 104094650 B | 9/2018 |
| CN | 104054377 B | 11/2018 |
| CN | 111713128 A | 9/2020 |
| CN | 113543247 B | 8/2022 |
| DE | 10122099 A1 | 1/2003 |
| DE | 10248988 A1 | 6/2003 |
| DE | 10345511 B4 | 11/2005 |
| DE | 102005006174 A1 | 8/2006 |
| DE | 102006031760 A1 | 1/2008 |
| DE | 202009018263 U1 | 9/2011 |
| DE | 202008018330 U1 | 2/2013 |
| DE | 102016004256 A1 | 10/2016 |
| DE | 102016206167 A1 | 11/2016 |
| DE | 112015006925 T5 | 6/2018 |
| DE | 102016209293 B4 | 4/2019 |
| DE | 112017004452 T5 | 6/2019 |
| DE | 102020110447 A1 | 1/2021 |
| DE | 112019000089 B4 | 9/2021 |
| DE | 102015111638 B4 | 1/2023 |
| EP | 2168391 A1 | 3/2010 |
| EP | 2380096 A2 | 10/2011 |
| EP | 2615874 A1 | 7/2013 |
| EP | 2430854 B1 | 3/2014 |
| EP | 2923504 A1 | 9/2015 |
| EP | 2180646 B1 | 11/2015 |
| EP | 2622903 B1 | 4/2017 |
| EP | 2876954 B1 | 6/2017 |
| EP | 3202168 A1 | 8/2017 |
| EP | 2901662 B1 | 9/2017 |
| EP | 2930986 B1 | 12/2017 |
| EP | 3275275 A1 | 1/2018 |
| EP | 2848017 B1 | 6/2018 |
| EP | 3446427 A1 | 2/2019 |
| EP | 2880913 B1 | 8/2019 |
| EP | 3355615 B1 | 8/2019 |
| EP | 2848044 B1 | 11/2019 |
| EP | 3025550 B1 | 1/2020 |
| EP | 3355618 B1 | 2/2020 |
| EP | 3439340 B1 | 5/2020 |
| EP | 3657835 A1 | 5/2020 |
| EP | 3914014 A1 | 11/2021 |
| EP | 3130171 B1 | 12/2021 |
| JP | 2011082980 A | 4/2011 |
| JP | 5011396 B2 | 6/2012 |
| JP | 5059228 B2 | 8/2012 |
| JP | 2012527837 A | 11/2012 |
| JP | 2014523213 A | 9/2014 |
| JP | 2015526950 A | 9/2015 |
| JP | 2016535506 A | 11/2016 |
| JP | 6182604 B2 | 7/2017 |
| JP | 6203412 B2 | 9/2017 |
| JP | 2017539161 A | 12/2017 |
| JP | 6310102 B2 | 3/2018 |
| JP | 6397138 B2 | 9/2018 |
| JP | 6556622 B2 | 7/2019 |
| JP | 6560128 B2 | 7/2019 |
| JP | 2019528628 A | 10/2019 |
| JP | 6697570 B2 | 4/2020 |
| JP | 6891186 B2 | 5/2021 |
| JP | 6913129 B2 | 7/2021 |
| JP | 2021184642 A | 12/2021 |
| JP | 7056875 B2 | 4/2022 |
| JP | 7156462 B2 | 10/2022 |
| JP | 7180663 B2 | 11/2022 |
| JP | 7184922 B2 | 11/2022 |
| KR | 100651548 B1 | 11/2006 |
| KR | 20080039816 A | 5/2008 |
| KR | 100930898 B1 | 12/2009 |
| KR | 20110113630 A | 10/2011 |
| KR | 20130054188 A | 5/2013 |
| KR | 101090552 B1 | 12/2013 |
| KR | 101340367 B1 | 4/2015 |
| KR | 101516998 B1 | 5/2015 |
| KR | 20150033578 A | 2/2016 |
| KR | 101593320 B1 | 6/2016 |
| KR | 101594392 B1 | 9/2016 |
| KR | 20160071426 A | 10/2017 |
| KR | 101858381 B1 | 5/2018 |
| KR | 20160108483 A | 12/2018 |
| KR | 20170117072 A | 1/2019 |

(56) References Cited

FOREIGN PATENT DOCUMENTS

| | | |
|---|---|---|
| KR | 101943174 B1 | 10/2020 |
| KR | 102164677 B1 | 10/2020 |
| KR | 20180135446 A | 10/2020 |
| KR | 20200113169 A | 10/2020 |
| KR | 102216156 B1 | 2/2021 |
| KR | 102324971 B1 | 11/2021 |
| KR | 102370463 B1 | 3/2022 |
| WO | 2007028328 A1 | 3/2007 |
| WO | 2010037321 A1 | 4/2010 |
| WO | 2010130277 A1 | 11/2010 |
| WO | 2013113240 A1 | 8/2013 |
| WO | 2013191770 A1 | 12/2013 |
| WO | 2014047928 A1 | 4/2014 |
| WO | 2015070582 A1 | 5/2015 |
| WO | 2015161575 A1 | 10/2015 |
| WO | 2015200617 A1 | 12/2015 |
| WO | 2016045410 A1 | 3/2016 |
| WO | 2018028279 A1 | 2/2018 |
| WO | 2018127235 A1 | 7/2018 |
| WO | 2018208211 A1 | 11/2018 |
| WO | 2019021048 A1 | 1/2019 |
| WO | 2019154239 A1 | 8/2019 |
| WO | 2019184859 A1 | 10/2019 |
| WO | 2019192366 A1 | 10/2019 |
| WO | 2020148658 A2 | 7/2020 |
| WO | 2020173299 A1 | 9/2020 |
| WO | 2020231117 A1 | 11/2020 |
| WO | 2020249068 A1 | 12/2020 |
| WO | 2021038443 A1 | 3/2021 |
| WO | 2021146913 A1 | 7/2021 |
| WO | 2021162617 A1 | 8/2021 |
| WO | 2021187893 A1 | 9/2021 |
| WO | 2021219102 A1 | 11/2021 |
| WO | 2021239895 A1 | 12/2021 |
| WO | 2021239899 A1 | 12/2021 |

* cited by examiner

ENABLING A FIRST MOBILE DEVICE ASSOCIATED WITH A WIRELESS TELECOMMUNICATION NETWORK TO RECEIVE ASSISTANCE FROM A SECOND MOBILE DEVICE IN A SHARED WEB PAGE

BACKGROUND

Despite approximately five billion people using the internet and being familiar with technology, there is a large portion of the population that feels less at ease with technology and the benefits it can provide. This audience can be defined as non-tech-savvy. The non-tech-savvy users may have installed WhatsApp or created a Facebook account to join a group and get connected with friends, however, they still feel that they need significant help to integrate technology into their daily lives.

BRIEF DESCRIPTION OF THE DRAWINGS

Detailed descriptions of implementations of the present invention will be described and explained through the use of the accompanying drawings.

Figure 1:
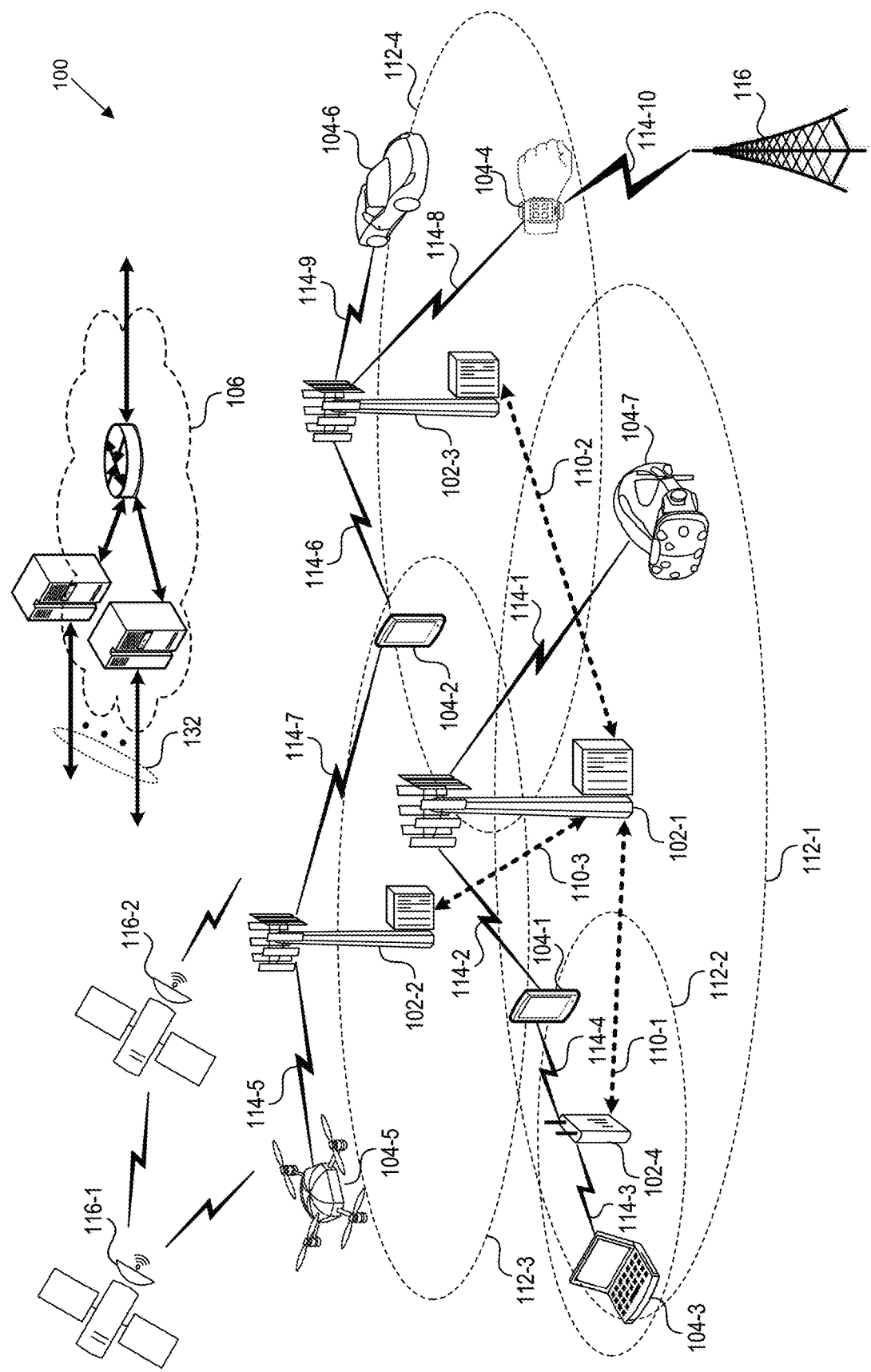
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to enable a mobile device A associated with a wireless telecommunication network to receive assistance from a mobile device B in a shared web page. The system receives, at a web page presented by a browser running on a mobile device A, an indication to seek assistance from a mobile device B. The web page can be a web page to purchase an item such as a new phone. The indication includes a unique identifier associated with the mobile device B, such as a phone number or an International Mobile Equipment Identity (IMEI).

The system generates a shared web page configured to present the web page and avatar A associated with the mobile device A. The avatar can be a geometric shape such as a cursor, a cartoon rendering of an object, or a photorealistic rendering of an object. The avatar A indicates a cursor location associated with the mobile device A and an input provided by the mobile device A. The system generates a universal resource locator (URL) identifying the shared web page. The system generates a message including the URL, and sends the message to the mobile device B.

The system receives a selection of the URL included in the message from the mobile device B. Upon receiving the selection of the URL, the system generates avatar B associated with the mobile device B, where the avatar B indicates a cursor location associated with the mobile device B. The system provides the shared web page, the avatar A, and the avatar B to the mobile device A and the mobile device B.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG) or wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
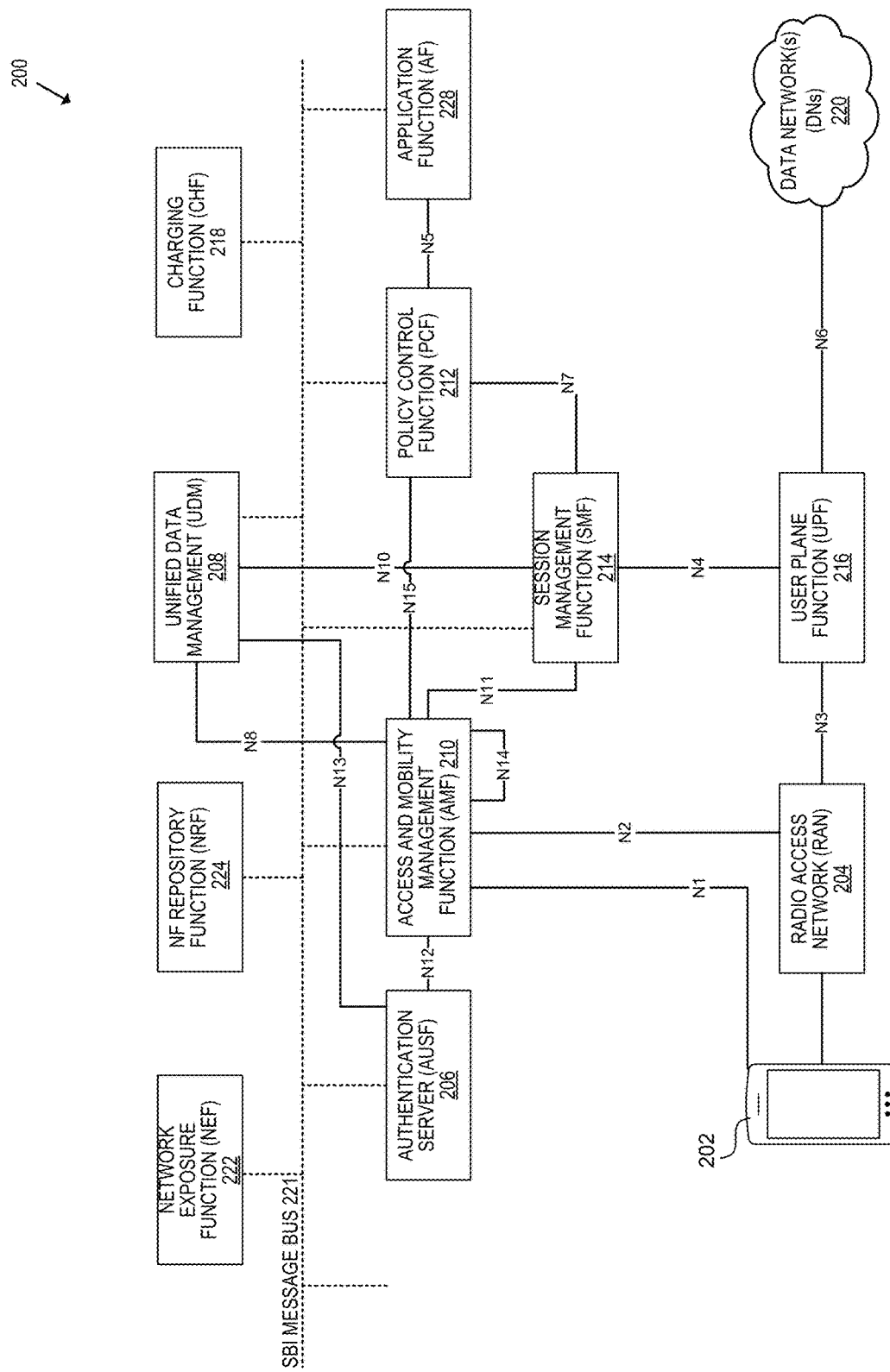
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
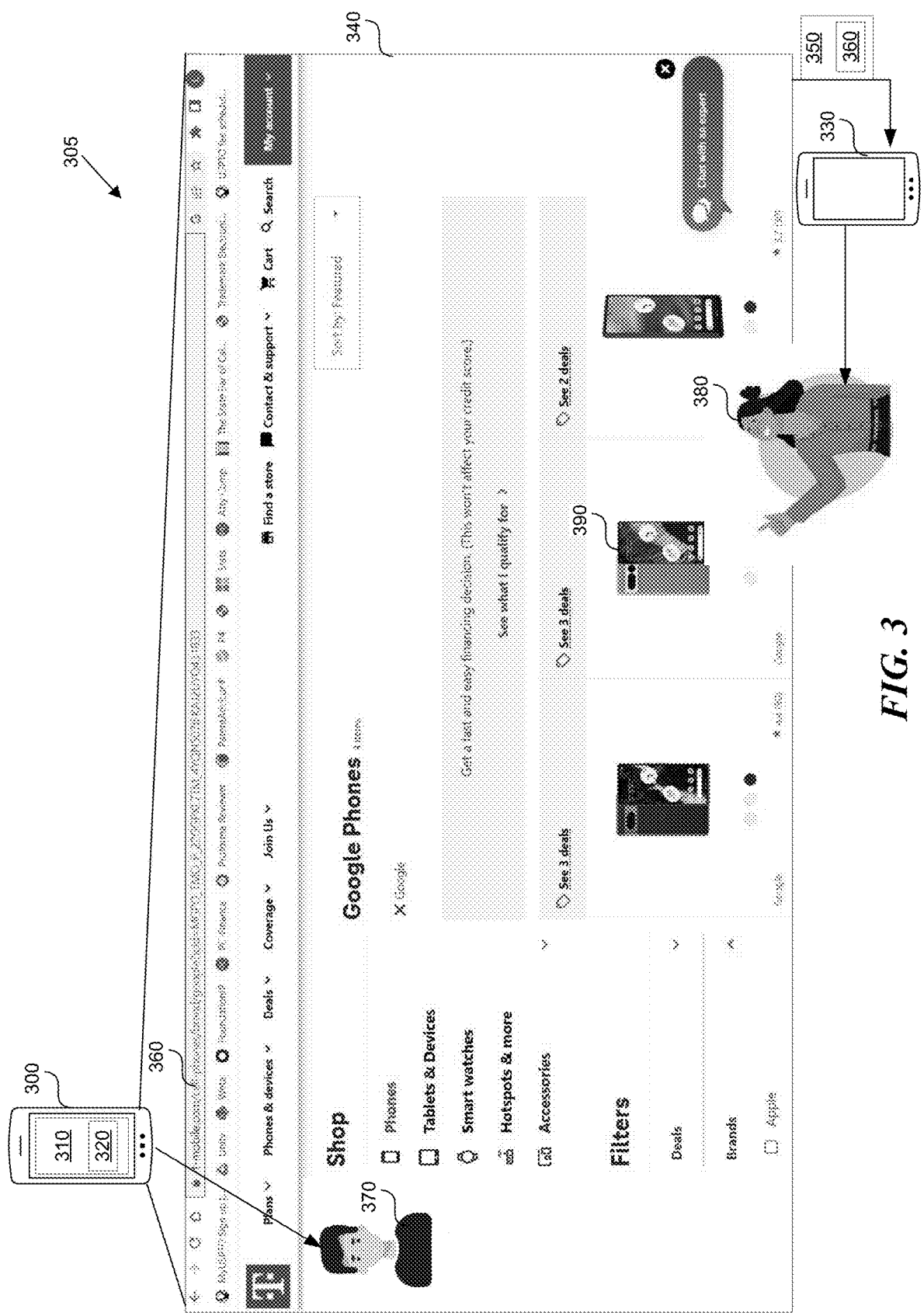
FIG. 3 shows a first user equipment (UE) receiving assistance from a second UE.

Enabling a First Mobile Device Associated with a Wireless Telecommunication Network to Receive Assistance from a Second Mobile Device in a Shared Web Page FIG. 3 shows a first UE receiving assistance from a second UE. The first UE 300 operating on the network 100 in FIG. 1 can be associated with a user that is not experienced in interacting with technology and that may need assistance to complete an interaction with a computer program 310, such as a browser, at least partially running on the first UE 300. The first UE 300 can provide an indication 320 to the computer program 310 that the first UE needs assistance. In addition, the indication 320 can include the unique identifier associated with the second UE 330. The unique identifier can include a phone number of the second UE, IMEI of the second UE, Internet address of the second UE, etc.

The unique identifier associated with the second UE 330 can be a part of a profile associated with the user. The profile can indicate one or more second UEs 330 that are authorized to assist the first UE 300.

The system 305, upon receiving the indication 320, can generate a shared digital location 340, such as a shared web page, which can enable the first user to share the screen of the first UE 300 with the second UE 330, without requiring the user to open another program to engage in screen sharing. The computer program 310 increases the ease-of-use and ease of receiving assistance by enabling screen sharing and communication with the second UE using just the single computer program 310.

To enable the sharing, the system 305 can generate a message 350 including a personalized URL 360 and send that message to the second UE 330. Once the second UE 330 selects the personalized URL 360 included in the message 350, the computer program 310 can enable screen sharing between the UEs 300, 330.

The system 305 can create an avatar 370, 380 for each user. The avatar 370, 380 can indicate location of a cursor associated with the first and second UE 300, 330, respectively. In addition, the avatars 370, 380 can indicate an action or suggestion that the user is making. For example, the position of the avatar 370 associated with the first UE 300 can indicate that the user is interested in buying the phone. The position and the action of the avatar 380 (such as pointing) associated with the second UE 330 can indicate a suggestion to buy a particular phone 390.

There can be multiple second UEs 330 helping the first UE 300. The system 305 can determine the number of the multiple second UEs 330 helping the first UE 300 and can present an offer based on the number of people involved. For example, the system 305 can receive an indication of an offer for a discount if three or more UEs except the offer, such as purchasing a new phone. If there are three or more UEs assisting the first UE 300 in the shared web page 340, the computer program 310 can present the offer to one or more of the UEs participating in the shared web page.

Figure 4:
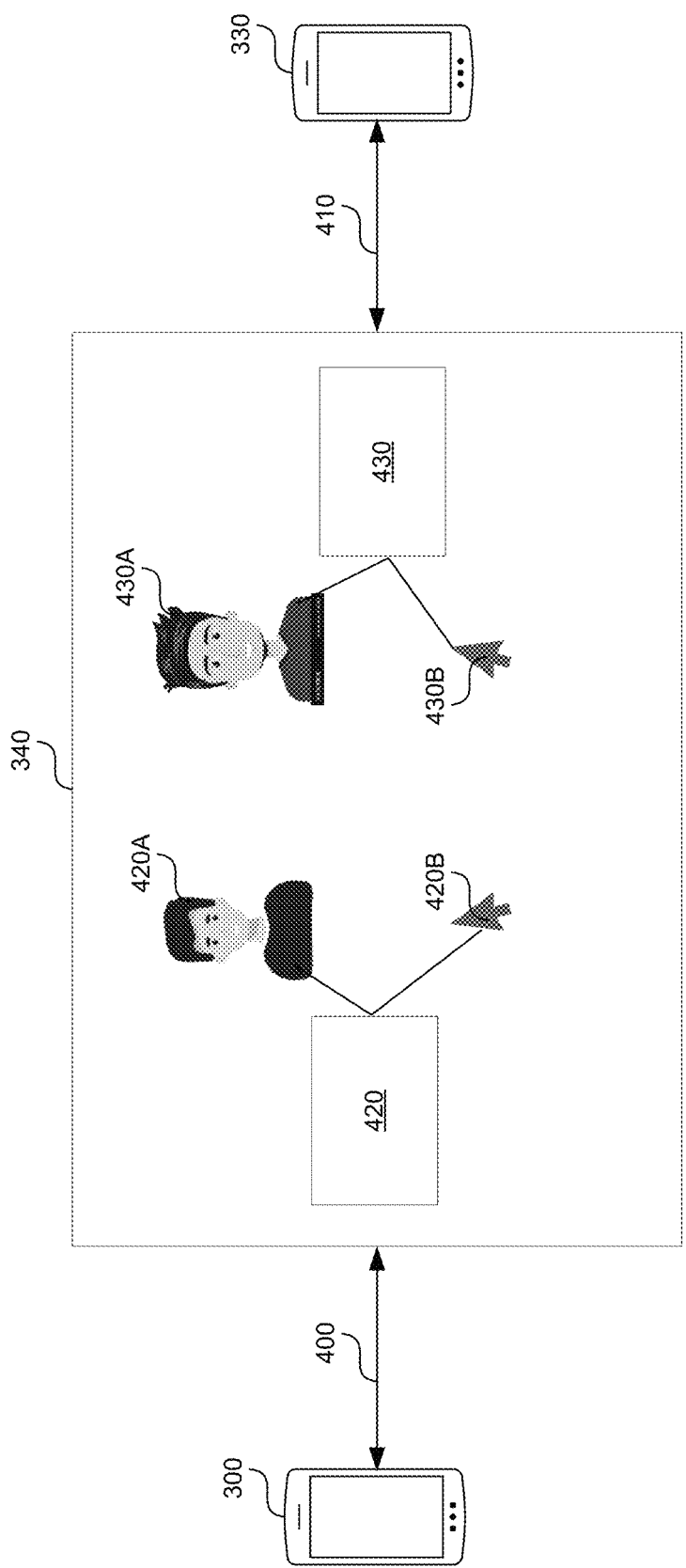
FIG. 4 shows the influence of the network bandwidth on rendering of the avatar.

FIG. 4 shows the influence of the network bandwidth on rendering of the avatar. The disclosed system can vary the rendering of the avatar depending on the amount of bandwidth available on the network connections 400, 410 between the UEs 300, 330 and the shared digital location 340. If the network bandwidth is high, the quality of the avatar 420, 430 rendering can be high, such as a photorealistic avatar. If the network bandwidth is medium, the quality of avatar 420, 430 rendering can be medium, such as a cartoon avatar 420A, 430A. If the network bandwidth is low, the avatar 420, 430 can just be a geometric shape, such as a cursor 420B, 430B. The two avatars can have different rendering depending on the bandwidth of network connections 400, 410 which can be independent of each other.

For example, the first UE 300 can be operating on a 5G network, while the second UE 330 can be operating on a lower generation network. In that case, the first avatar 420 can be photorealistic avatar, while the second avatar 430 can be a cursor.

Figure 5A:
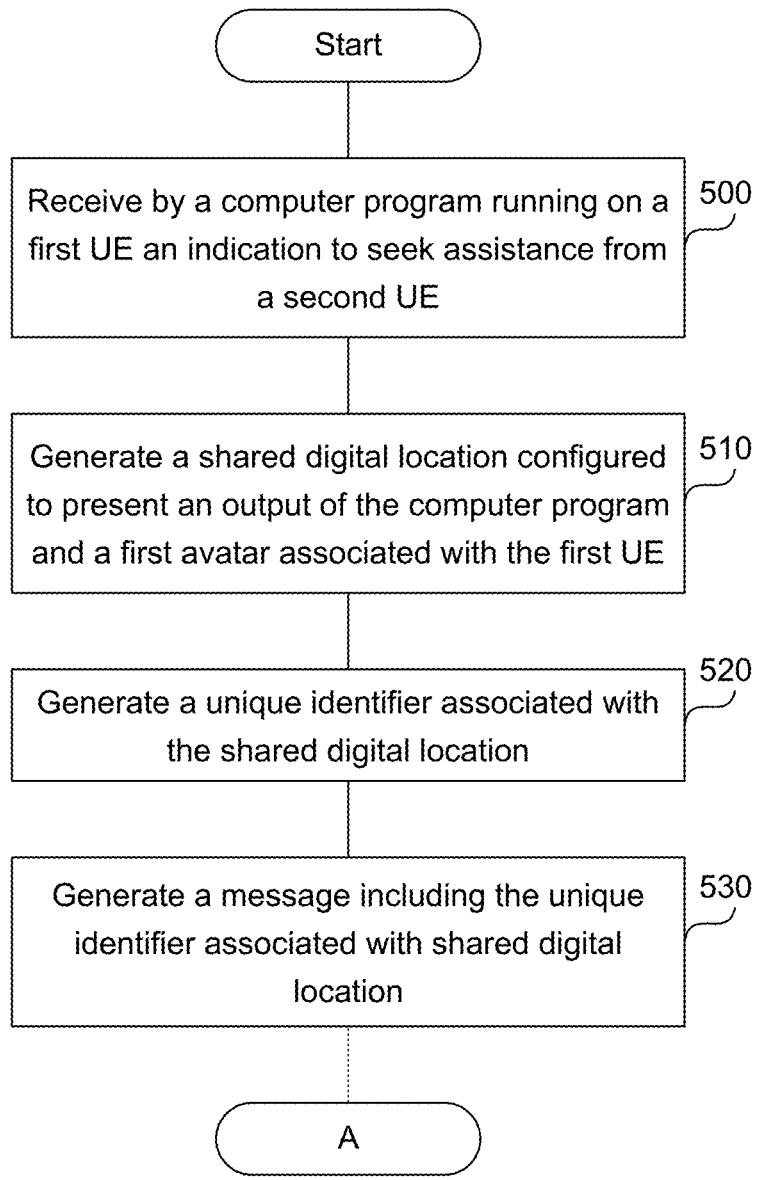
FIGS. 5A-5B show a flowchart of a method to enable a first mobile device associated with a wireless telecommunication network to receive assistance from a second mobile device in a shared digital location.
Figure 5B:
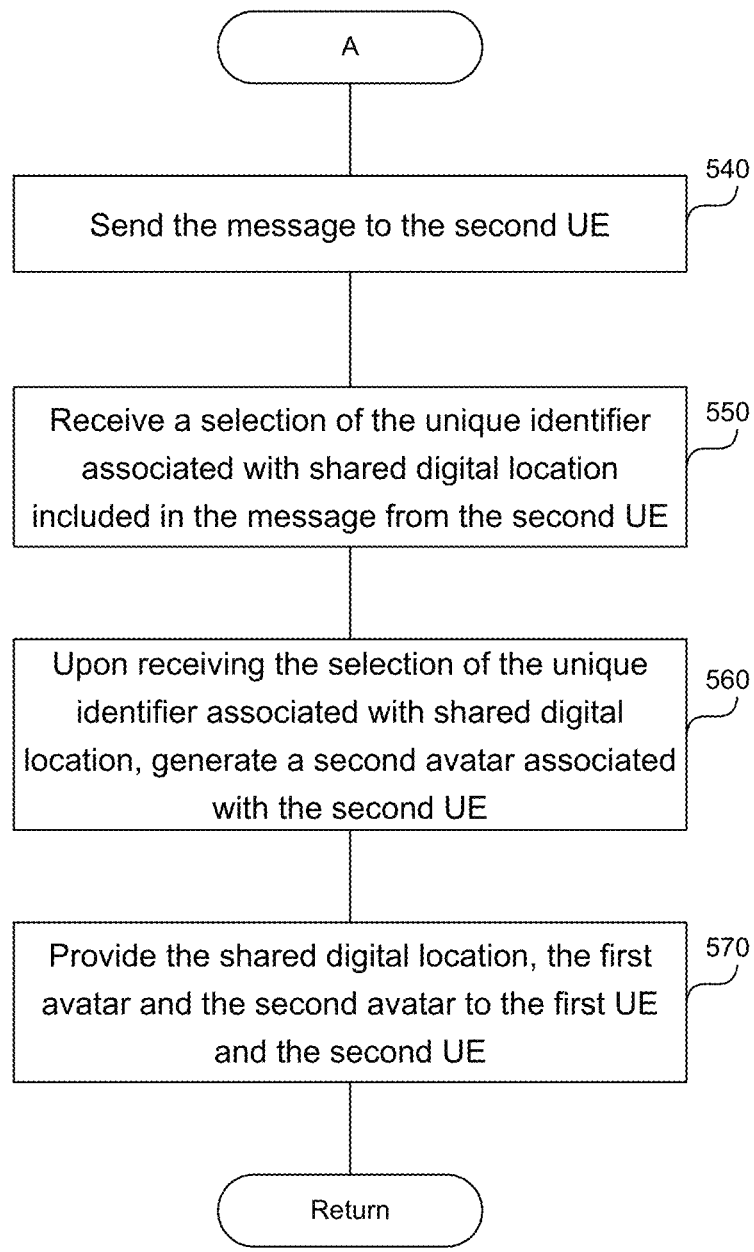

FIGS. 5A-5B show a flowchart of a method to enable a first mobile device associated with a wireless telecommunication network to receive assistance from a second mobile device in a shared digital location. A hardware or software processor executing instructions describing this application can, in step 500, receive at a computer program running on a first UE an indication to seek assistance from a second UE, where the indication includes a unique identifier associated with the second UE. The unique identifier can be a phone number, an IMEI, an Internet address associated with the second UE, etc. The computer program can be a web browser, an application, a user interface, etc.

In step 510, the processor can generate a shared digital location configured to present an output of the computer program and a first avatar associated with the first UE. The shared digital location can be a web page. The avatar can be a photorealistic rendering, a cartoon rendering, or a geometric shape such as a cursor. The first avatar can indicate a cursor location associated with the first UE and an input provided by the first UE. The input can be a hovering action over a link in the web page, which the avatar can represent by pointing to the link. Then the input can be a selection of the link, which the avatar can represent by a pressing motion or by producing and expanding in size.

In step 520, the processor can generate a unique identifier associated with the shared digital location. The unique identifier can be a URL.

In step 530, the processor can generate a message including the unique identifier associated with shared digital location. In step 540, the processor can send the message to the second UE. In step 550, the processor can receive a selection of the unique identifier associated with shared digital location included in the message from the second UE.

In step 560, upon receiving the selection of the unique identifier associated with shared digital location, the processor can generate a second avatar associated with the second UE, where the second avatar indicates a cursor location associated with the second UE. In step 570, the processor can provide the shared digital location, the first avatar, and the second avatar to the first UE and the second UE.

Depending on permission being granted by the first UE, the second avatar may or may not be able to perform actions in the shared digital location. The processor can receive an input from the second UE, where the input indicates an action such as selection of a link in the shared digital location. In one embodiment, the processor can present a query to the first UE asking for permission to enable the second UE to interact with the shared digital location. Upon receiving the permission, the processor can generate an action by the second avatar indicating an interaction of the shared digital location. The processor can process the input received from the second UE. Upon receiving an indication that the permission is denied, the processor can notify the second UE that the input from the second UE cannot be processed. In another embodiment, instead of presenting the query to the first UE, the permission can be stored in the profile associated with the user. The profile can identify the second UEs that have the permission to perform actions within the shared digital location.

Since the user of the first UE may not be tech-savvy, the processor can perform a security check prior to sharing the screen with the second UE. The processor can determine whether the first UE interacted with the second UE in the past. To make this determination, the processor can check the contact stored on the first UE or can check call and text logs associated with the first UE and recorded by the network 100 in FIG. 1. Upon determining the first UE interacted with the second UE in the past, the processor can send a message to the second UE. Upon determining that the first UE did not interact with the second UE in the past, the processor can send a request to the first UE to verify the unique identifier associated with the second UE, such as by requiring the user of the first UE to type in the unique identifier of the second UE again. If the unique identifiers match, the processor can begin screen sharing. If the unique identifiers do not match, the processor can refuse to share the screen with the second UE.

The processor can present custom offers depending on how many UEs are participating in screen sharing. The processor can receive the indication including multiple unique identifiers associated with multiple UEs. The processor can send the message to the multiple UEs. The processor can determine whether the number of UEs accessing the shared digital location exceeds one UE. The processor can obtain an offer providing incentives when more than one UE accepts the offer. Upon determining that the number of UEs accessing the shared digital location exceeds one UE, the processor can present the offer to a UE accessing the shared digital location.

The processor can adjust the rendering of the avatar based on network bandwidth. The processor can determine a first network bandwidth between the first UE and the shared digital location and a second network bandwidth between the second UE and the shared digital location. Based on the first network bandwidth, the processor can determine a quality of the first avatar to present, and based on the second network bandwidth, the processor can determine a quality of the second avatar to present. For example, if the network bandwidth is low, the avatar can be a geometric shape such as a cursor.

Computer System

Figure 6:
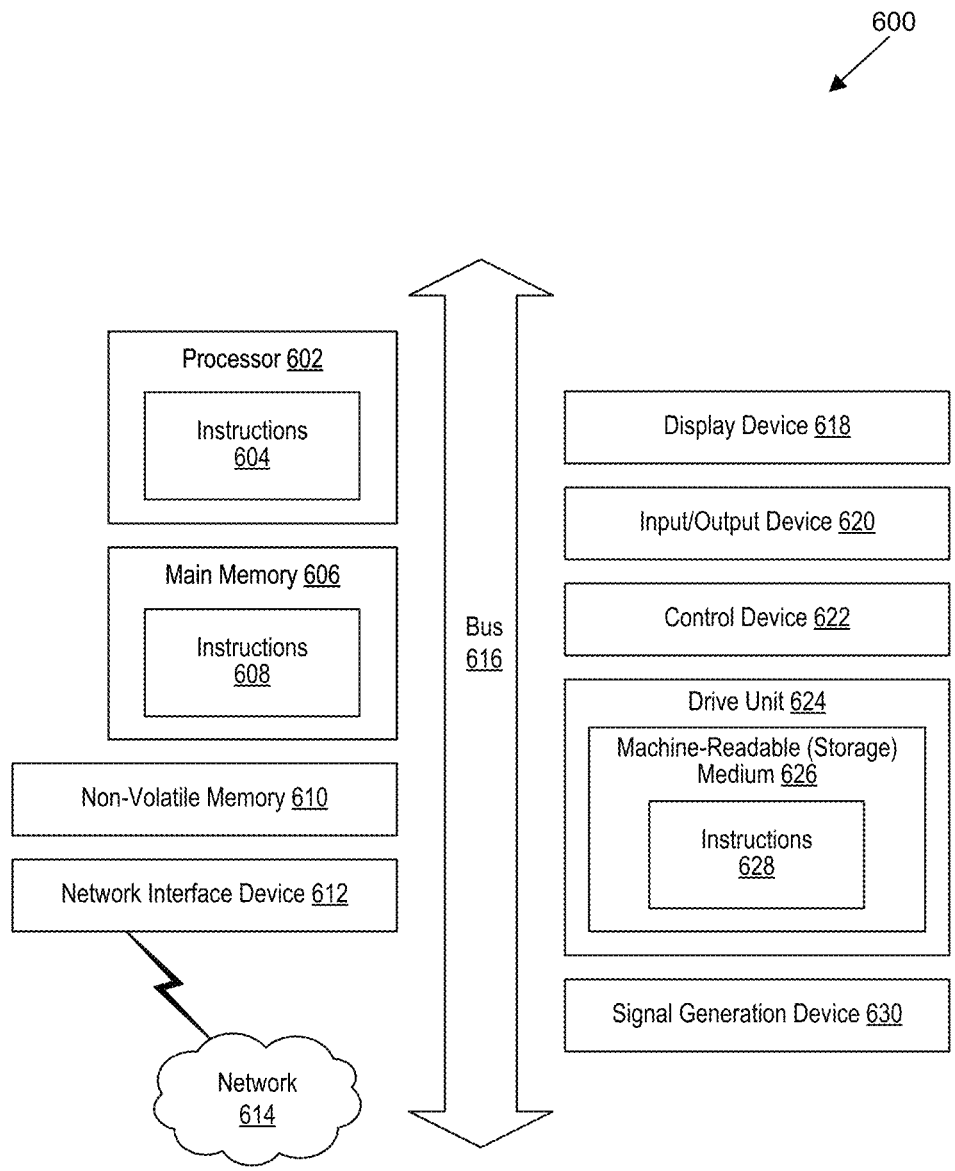
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630, which are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the Figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems or include one or more cloud components in one or more networks. Where appropriate, one or more computer systems 600 can perform operations in real time, near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above and any that may be listed in accompanying filing papers are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one non-transitory, computer-readable storage medium storing instructions to enable a first mobile device associated with a wireless telecommunication network to receive assistance from a second mobile device in a shared web page, which, when executed by at least one data processor of a system, cause the system to:
   receive, by a web page presented by a browser running on a first mobile device, an indication to seek assistance from a second mobile device,
      wherein the indication includes a unique identifier associated with the second mobile device;
   generate the shared web page configured to present the web page and a first avatar associated with the first mobile device,
      wherein the first avatar indicates a cursor location associated with the first mobile device and an input provided by the first mobile device;
   generate a universal resource locator (URL) identifying the shared web page;
   generate a message including the URL;
   send the message to the second mobile device;
   receive a selection of the URL included in the message from the second mobile device;
   upon receiving the selection of the URL, generate a second avatar associated with the second mobile device,
      wherein the second avatar indicates a cursor location associated with the second mobile device; and
   provide the shared web page, the first avatar, and the second avatar to the first mobile device and the second mobile device.

2. The at least one non-transitory, computer-readable storage medium of claim 1, comprising instructions to:
   receive an input from the second mobile device;
   present a query to the first mobile device asking for permission to enable the second mobile device to interact with the shared web page;
   upon receiving the permission, generate an action by the second avatar indicating an interaction of the shared web page;

process the input received from the second mobile device; and
upon receiving an indication that the permission is denied, notify the second mobile device that the input from the second mobile device cannot be processed.

3. The at least one non-transitory, computer-readable storage medium of claim 1, comprising instructions to:
determine whether the first mobile device interacted with the second mobile device in the past;
upon determining that the first mobile device interacted the second mobile device in the past, send a message to the second mobile device; and
upon determining that the first mobile device did not interact with the second mobile device in the past, send a request to the first mobile device to verify the unique identifier associated with the second mobile device.

4. The at least one non-transitory computer-readable storage medium of claim 1, comprising instructions to:
receive the indication including multiple unique identifiers associated with multiple mobile devices;
send the message to the multiple mobile devices;
determine whether the number of mobile devices accessing the shared web page exceeds one mobile device;
obtain an offer providing incentives when more than one mobile device accepts the offer; and
upon determining that the number of mobile devices accessing the shared web page exceeds one mobile device, present the offer to a mobile device accessing the shared web page.

5. The at least one non-transitory, computer-readable storage medium of claim 1, comprising instructions to:
determine a first network bandwidth between the first mobile device and the shared web page, and a second network bandwidth between the second mobile device and the shared web page;
based on the first network bandwidth, determine a quality of the first avatar to present; and
based on the second network bandwidth, determine a quality of the second avatar to present.

6. The at least one non-transitory, computer-readable storage medium of claim 1, comprising instructions to:
determine whether the number of mobile devices accessing the shared web page exceeds one mobile device;
obtain an offer providing incentives when more than one mobile device accepts the offer; and
upon determining that the number of mobile devices accessing the shared web page exceeds one mobile device, present the offer to a mobile device accessing the shared web page.

7. A system comprising:
at least one hardware processor; and
at least one non-transitory memory storing instructions, which, when executed by the at least one hardware processor, cause the system to:
receive, by a computer program running on a first UE, an indication to seek assistance from a second UE, wherein the indication includes a unique identifier associated with the second UE;
generate a shared digital location configured to present an output of the computer program and a first avatar associated with the first UE,
wherein the first avatar indicates a cursor location associated with the first UE and an input provided by the first UE;
generate a unique identifier associated with the shared digital location;
generate a message including the unique identifier associated with shared digital location;
send the message to the second UE;
receive a selection of the unique identifier associated with shared digital location included in the message from the second UE;
upon receiving the selection of the unique identifier associated with shared digital location, generate a second avatar associated with the second UE,
wherein the second avatar indicates a cursor location associated with the second UE; and
provide the shared digital location, the first avatar, and the second avatar to the first UE and the second UE.

8. The system of claim 7, comprising instructions to:
receive an input from the second UE;
present a query to the first UE asking for permission to enable the second UE to interact with the shared digital location;
upon receiving the permission, generate an action by the second avatar indicating an interaction of the shared digital location;
process the input received from the second UE; and
upon receiving an indication that the permission is denied, notify the second UE that the input from the second UE cannot be processed.

9. The system of claim 7, comprising instructions to:
determine whether the first UE interacted with the second UE in the past;
upon determining that the first UE interacted with the second UE in the past, send a message to the second UE; and
upon determining that the first UE did not interact with the second UE in the past, send a request to the first UE to verify the unique identifier associated with the second UE.

10. The system of claim 7, comprising instructions to:
receive the indication including multiple unique identifiers associated with multiple UEs;
send the message to the multiple UEs;
determine whether the number of UEs accessing the shared digital location exceeds one UE;
obtain an offer providing incentives when more than one UE accepts the offer; and
upon determining that the number of UEs accessing the shared digital location exceeds one UE, present the offer to a UE accessing the shared digital location.

11. The system of claim 7, comprising instructions to:
determine a first network bandwidth between the first UE and the shared digital location and a second network bandwidth between the second UE and the shared digital location;
based on the first network bandwidth, determine a quality of the first avatar to present; and
based on the second network bandwidth, determine a quality of the second avatar to present.

12. The system of claim 7, comprising instructions to:
determine whether the number of UEs accessing the shared digital location exceeds one UE;
obtain an offer providing incentives when more than one UE accepts the offer; and
upon determining that the number of UEs accessing the shared digital location exceeds one UE, present the offer to a UE accessing the shared digital location.

13. A method comprising:
receiving, by a computer program running on a first UE, an indication to seek assistance from a second UE, wherein the indication includes a unique identifier associated with the second UE;

generating a shared digital location configured to present an output of the computer program and a first avatar associated with the first UE,
  wherein the first avatar indicates a cursor location associated with the first UE and an input provided by the first UE;

generating a unique identifier associated with the shared digital location;

generating a message including the unique identifier associated with shared digital location;

sending the message to the second UE;

receiving a selection of the unique identifier associated with shared digital location included in the message from the second UE;

upon receiving the selection of the unique identifier associated with shared digital location, generating a second avatar associated with the second UE,
  wherein the second avatar indicates a cursor location associated with the second UE; and providing the shared digital location, the first avatar, and the second avatar to the first UE and the second UE.

14. The method of claim 13, comprising:
receiving an input from the second UE;
presenting a query to the first UE asking for permission to enable the second UE to interact with the shared digital location; and
upon receiving the permission, generating an action by the second avatar indicating an interaction of the shared digital location.

15. The method of claim 13, comprising:
receiving an input from the second UE;
presenting a query to the first UE asking for permission to enable the second UE to interact with the shared digital location; and
upon receiving an indication that the permission is denied, notifying the second UE that the input from the second UE cannot be processed.

16. The method of claim 13, comprising:
determining whether the first UE interacted with the second UE in the past; and
upon determining that the first UE interacted with the second UE in the past, sending a message to the second UE.

17. The method of claim 13, comprising:
determining whether the first UE interacted with the second UE in the past; and
upon determining that the first UE did not interact with the second UE in the past, sending a request to the first UE to verify the unique identifier associated with the second UE.

18. The method of claim 13, comprising:
receiving the indication including multiple unique identifiers associated with multiple UEs;
sending the message to the multiple UEs;
determining whether the number of UEs accessing the shared digital location exceeds one UE;
obtaining an offer providing incentives when more than one UE accepts the offer; and
upon determining that the number of UEs accessing the shared digital location exceeds one UE, presenting the offer to a UE accessing the shared digital location.

19. The method of claim 13, comprising:
determining a first network bandwidth between the first UE and the shared digital location, and a second network bandwidth between the second UE and the shared digital location;
based on the first network bandwidth, determining a quality of the first avatar to present; and
based on the second network bandwidth, determining a quality of the second avatar to present.

20. The method of claim 13, comprising:
determining whether the number of UEs accessing the shared digital location exceeds one UE;
obtaining an offer providing incentives when more than one UE accepts the offer; and
upon determining that the number of UEs accessing the shared digital location exceeds one UE, presenting the offer to a UE accessing the shared digital location.

* * * * *